ELECTROMAGNETIC QUANTIZER

Filed Feb. 27, 1962

INVENTOR.
Robert R. Bockemuehl
BY
Paul J. Ethington
ATTORNEY

United States Patent Office 3,155,960

Patented Nov. 3, 1964

3,155,960

ELECTROMAGNETIC QUANTIZER

Robert R. Bockemuehl, Birmingham, Mich., assignor to General Motors Corporation, Detroit, Mich., a corporation of Delaware Filed Feb. 27, 1962, Ser. No. 176,017
6 Claims. (Cl. 340—347)

This invention relates to an electromagnetic circuit for converting an electrical signal amplitude to an analogous serial digit form, and more particularly, to a converter of this type employing magnetic means for defining a plurality of flux paths each of which has two stable states of residual magnetism.

Recently, various logic and converter circuit techniques have exhibited an increasing use of magnetically saturable elements composed of material which is characterized by a high degree of residual flux retentivity. One example of the use of elements of this type is a torodial magnetic ring which may be magnetized either in a clockwise or counterclockwise direction over all, or any part of, its radial length. The torodial ring is often used as a memory element in a logic circuit for a computer. Later in the history of these magnetic elements it was realized that other functions could be performed by an assembly of magnetic elements and even later that this assembly could be compacted by using substantially flat plates of magnetic material. A plurality of apertures in these plates are strategically located so as to define a plurality of flux paths of differing lengths. A current carrying input winding can be wound on the magnetic elements so as to link all of the several flux paths to register information in the element according to the direction of saturation in each path.

A particular form of magnetic element now commonly known is in the form of a round flat disc of substantially square loop material. A central opening or aperture is formed near the center of the disc and is linked by an input winding. A series of smaller apertures spaced radially outward from the center hole may each be wound with individual output windings or, in the alternative, with a common output winding. This is, of course, equivalent to a series of separate rings of graduated sizes linked by a common input winding. Employing this design as a means for converting a voltage amplitude signal into a series of discrete output pulses, the following principles are applied.

The disc is made from a material which has a square or rectangular loop magnetic characteristic. That is, a plot of field strength against flux density will be substantially rectangular or square and located symmetrically about the intersection of the field strength and flux density axes. The field strength, usually plotted on the abscissa, is given in terms of amperes per meter with the current value being that which is conducted through the input winding linking all of the flux paths. It can be seen that if the current is a linear function of time, the abscissa can also be expressed in terms of time.

Assuming a complete absence of magnetic history in this element, as the input winding current is increased, the flux density in the element may increase slowly at first, then quite rapidly until a saturation value of flux density is reached. At this value of flux density, further increases in field strength will be ineffective to significantly increase the flux density. When the input current is extinguished the flux density within the element will be retained substantially at the saturation level. Upon application of input current in a direction opposite to that which originally saturated the element, it has been found that the element will experience no change in flux density until a particular value of field strength, commonly denoted the coercive field strength, is reached. At this value of field strength the flux density will abruptly reverse its direction of saturation and go to what might be called a negative saturation level. At this point, further increases in the input current value and, hence, the field strength are ineffective to increase the flux density. The value of input current required to set up the coercive field strength in each flux path will be a function of the length of the path and the number of turns in the input winding linking the path. Using the multi-apertured element, all paths are wound with the same number of turns. However, in using separate rings, each path may be wound with a different number of turns. Since it has been stated that the critical value of input current is a function of the number of input turns for each path, it can be seen that using a series of rings of one size but with graduated numbers of input winding turns is equivalent to using graduated rings with the same number of turns on each ring. It is thus to be understood that the present invention is not limited to the use of a multi-apertured disc but can be practiced with either of its equivalents.

Applying the foregoing principles to a multi-apertured disc for analog-to-digital conversion, asume that the magnetic history of the disc is such that the residual flux density is at its negative level of saturation throughout the disc. Current flowing through the input winding in a direction which causes a flux density increase in the positive direction will induce a magnetic field which, if it is of the coercive field strength, is effective to cause a reversal in flux density to the positive saturation level. This induced magnetic field is proportional to the number of turns on the input winding and the current through the winding, and inversely proportional to the length of the flux path which is linked. In the case of a round disc with a central input opening, it can be seen that, because the length of the magnetic circuit increases with the radial distance from the center of the disc, at a given value of input ampere turns the value of field strength decreases accordingly. For a particular value of input current there will be a particular radial distance from the central input opening at which the magnetic field is of a strength equal to the coercive strength required to reverse the direction of saturation. There will, of course, be small current values at which no portion of the disc experiences the coercive field strength but for purposes of discussion, the sufficient ampere turns are assumed to exist. As the input current is increased, the radial distance at which the field strength is equal to the coercive field strength will move radially outward in the disc. Thus, output windings which enclose different radial portions of the magnetic disc by means of the small apertures therein will have induced in them a secondary voltage which is proportional to the time rate of change of the magnetic flux in the volume enclosed by the coil. Therefore, a voltage pulse is produced in each output winding as the coercive field strength region moves radially outward to the extremities of the element. It can be seen that as the input current increases, a pulse will be produced at a particular value of input current determined by the radial location of the secondary coil. Coils farther from the center produce pulses at proportionally larger input currents. The same considerations are applicable to a system of separate graduated rings linked by a common input winding. It will also be understood that rings of constant size can be similarly employed by decreasing the number of input turns on each successive ring in a regular order.

From the foregoing considerations, it is apparent that a practicable analog-to-digital converter can be constructed in the manner set forth. Assuming a ramp-type input current, the amplitude of which at any time is an analog representation of a quantity to be measured and indicated in terms of the number of output pulses, the number of output pulses obtainable would be limited only by the number of output windings which can be placed or wound through apertures in the element. Power requirement is a practical consideration and thus a limit of flux path length will be established. Since size is an important factor in computer equipment design, it is desirable to obtain the highest number of recognizable pulses possible from each multi-apertured element. In general terms this is accomplished by narrowing the flux paths so as to obtain from a given radial length the greatest possible number of flux paths. However, it has been shown that in a practical application of a multi-apertured magnetic disc, the number of well resolved output pulses obtainable is further limited by the quality of the square loop characteristic of the material. Although values as high as ninety-five percent residual flux retentivity have been obtained, no element is known which has a perfectly square or rectangular hysteresis loop. Because the loop is not square, a finite time is required for a magnetic material to "switch" from one flux state to the other. Therefore, the radial point at which the field strength is equal to the coercive field strength required to revert the flux condition will not be an infinitely narrow transition boundary but will occupy a finite width. Thus, to obtain highly resolved pulses, the radial distance between output apertures must be substantially greater than the width of the transition region or else the pulses will overlap and lose definition. Therefore, the number of flux paths and, consequently, the number of discrete pulses obtainable from any one magnetic element is severely limited. Similarly, the graduations in ring size and/or input winding numbers must be greater than some specific value in the separate ring systems to obtain highly resolved pulses.

It is, therefore, the primary object of this invention to provide means through which a greater number of flux paths can be provided within a given radial length without sacrificing definition in the output pulses produced in the windings linking the flux paths. Thus, a larger number of highly resolved output pulses is obtainable from a multi-apertured magnetic core element of given radius than was heretofore obtainable. Similarly, the invention allows finer graduations between the parameters of either flux path length, input current amperes, or number of input winding turns.

It is a further object of this invention to provide an improvement in analog-to-digital converter of the type employing square loop magnetic elements, through which a more precise conversion of the analog signal into a series of output pulses is obtainable.

These objects are generally accomplished by the provision of output windings which link respective flux paths in a particular configuration, which configuration is effective to induce a series of output pulses of alternating polarity, and means for fully rectifying the series of alternate polarity output pulses to provide a series of unipolar pulses. Because successive pulses are of alternating polarity, the overlapping areas tend to cancel one another. The invention thus provides means to obtain a greater number of readily distinguishable digital pulses of a particular polarity than was obtainable from previously known converters of this type.

These and other advantages of the present invention will be more readily understood upon reading of the specification in which a particular embodiment of the invention is described taken with the accompanying drawings of which:

Figure 1:
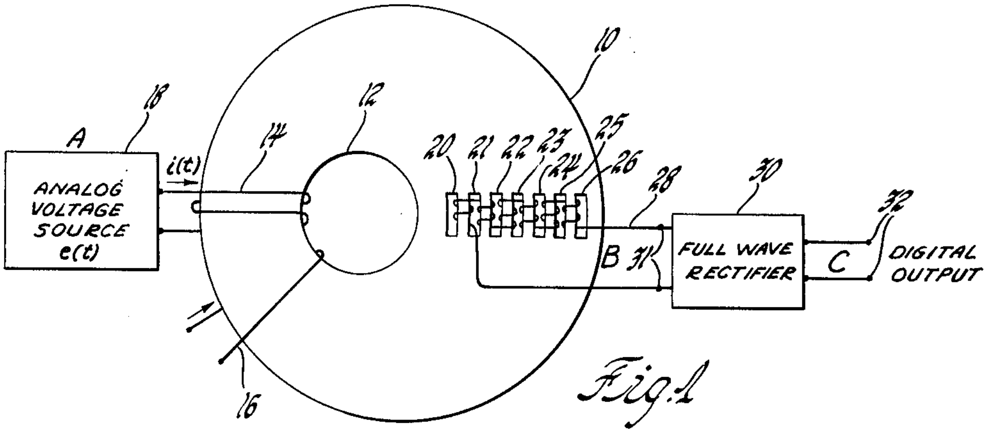
FIGURE 1 is a schematic diagram of the invention as embodied in an analog-to-digital converter of the multi-apertured disc type.
Figure 4:
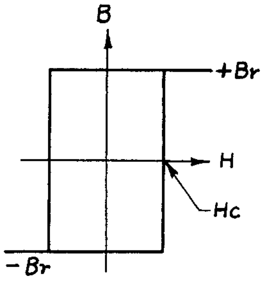
FIGURE 4 represents the ideal hysteresis loop for a magnetic core element.

Referring now to FIGURE 1, there is shown an embodiment of the invention in an analog-to-digital converter. The system shown in FIGURE 1 is adapted to convert an analog ramp voltage into a series of up to six digital pulses. The transducer 10 in this converter system is shown as a round flat disc of magnetic material whose hysteresis loop characteristic is substantially rectangular as shown in FIGURE 4. The transducer 10 has formed somewhat off center therein a central aperture 12 which is adapted to accommodate an input winding 14 and a reset winding 16. Connected to the input winding 14 is a source 18 of time varying analog voltage signals. The analog voltage source 18 produces a unidirectional current in the input winding 14 which flows through the input winding 14 in the direction indicated on the drawing. Although it is not shown in the drawing, the reset winding 16 may be connected to a source of reset voltage pulses which induce a current in the reset winding 16 in the direction indicated. The reset pulse source is synchronized with, or triggered by the source 18 such that the reset pulses occur between successive analog voltage pulses. Employing the usual right-hand rule of flux-current relation, it should be noted that the current through winding 14 will induce a flux in the transducer 10 opposite in direction to that flux induced by the current in the reset winding 16.

Also formed in the transducer 10 are a series of smaller apertures 20 through 26 which are disposed at equal radial distances from the central aperture 12. The apertures 20 through 26 serve to define individual flux paths of distinct lengths and also accommodate the necessary configuration of an output winding 28. Clearly, the transducer 10 may be replaced with an equivalent array of separate rings. The central aperture 12 is located in the transducer 10 such that the total volume encompassed by the input winding 14, shown in the drawing to the left of the central aperture 12, will be equal to the aggregate sum of the volume between the apertures 20 through 26, shown in the drawing to the right of the central aperture 12. The apertures 20 through 26 enclose areas of the transducer 10 which are individually wound by the output winding 28 so as to have individual discrete voltage pulses induced therein at a particular value of current through the input winding 14. The output winding 28 is connected to a full wave rectifier 30 by means of a pair of input terminals 31. The rectifier 30 may be of a conventional full wave rectifier nature and is adapted to fully rectify the signal appearing on the output winding 28. The output of the rectifier 30 appears on the output terminals 32 which are adapted to be connected to further pulse shaping means, if desired, or directly to a utilization device for the digital output such as a computer memory circuit.

As previously mentioned, the transducer 10 is constructed of a material which exhibits a substantially square or rectangular hysteresis loop such as that ideally shown in FIGURE 4. Assuming that a condition of residual flux density equal to the negative saturation level $-B_r$ exists throughout the entire transducer 10 in a counterclockwise direction as shown in the drawing, it can be seen that a current through the input winding 14 in the direction indicated will be effective at a particular value to reverse this residual flux condition. Current through the input winding 14 in the direction indicated induces a magnetic field H which, when it reaches a certain value $H_c$, will cause a reversal in flux density to the positive saturation level $+B_r$ in the transducer 10. The induced magnetic field H is proportional to the number of turns in the input winding 14 which link the transducer 10, the current through the winding 14, and inversely proportional to the effective length of the magnetic circuit. It can be seen that for a particular value of input winding current, the field strength H will decrease with the radial distance from the center of the transducer 10 inasmuch as the effective lengths of the magnetic circuits defined by the apertures 20 through 26 will increase with the radial distance. For a particular value of current through the input winding 14, there will be a particular radial distance at which the magnetic field strength H is equal to the coercive field strength $H_c$ necessary to effect a flux reversal in the transducer 10. This distance defines a transition boundary across which the flux density reverses polarity.

Figure 2:
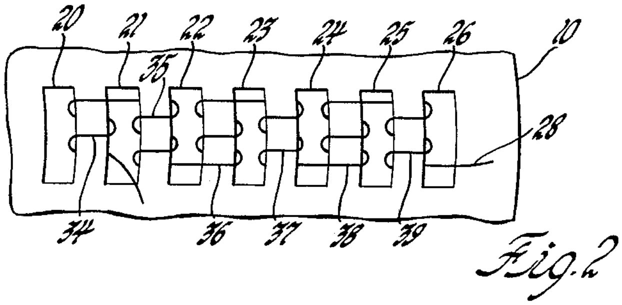
FIGURE 2 is a broken-away section of the magnetic element of FIGURE 1 showing a particular output winding configuration which practices the present invention.

The output winding 28, which is more clearly shown in FIGURE 2, comprises a series of secondary coils 34–39 connected in series. Adjacent coils in the series are wound in opposite directions around the flux paths defined by the apertures 20 through 26.

When the current through the input winding 14 has increased to the point where the field strength H has increased to pass the flux transition region across the area of the transducer 10 between apertures 20 and 21, a flux reversal from $-B_r$ to $+B_r$ is experienced in that portion of the transducer 10. Because of the change in flux with respect to time, a voltage pulse is induced in the coil 34 linking the portion of the transducer 10 between apertures 20 and 21. If the current through the input winding 14 continues to increase linearly to the point where the field strength H throughout the transducer 10 exceeds the coercive field strength $H_c$, it can be seen that a series of six output pulses will be induced in the secondary coils 34 through 39. Since the secondary coils 34–39 are all connected in series in the output winding 28, a series of time spaced discrete pulses will appear at the input to the rectifier 30.

The previously mentioned transition boundary across which the flux density in the transducer 10 reverses polarity is generally thought of as being an infinitely narrow boundary region since the hysteresis loop of the material concerned will be substantially square. However, because ideal squareness of the hysteresis loop cannot be obtained, the transition boundary is in the form of a finite transition region. Thus, an array of adjacent secondary coils, such as 34 through 39, each successively farther from the center of the transducer 10, will produce a pulse in the output winding 28 at successively greater values of current through the input winding 14. Since the secondary coils 34 through 39 are uniformly spaced, the number of pulses produced is a linear function of the maximum amplitude of the current through the input winding 14. However, it should be noted that while each of the secondary coils produces a discrete pulse, when the pulses are added in series on a common output winding, the result will not be a series of discrete pulses unless the distance between coils is greater than the width of the transition region. As was previously mentioned, the H axis in FIGURE 4 can be expressed in terms of time where the field producing current is a time-varying function. Thus, it can be seen that the time lag in the pulse production, that is, the width of the pulse, is due to the slight slope of the vertical line between $-B_r$ and $+B_r$. Because of this slope, as the voltage in secondary coil 34, for example, decreases due to the finite transition zone moving beyond the portion of the transducer 10 which is linked by the secondary coil 34, the voltage in the adjacent coil 35 will increase as the transition zone moves into that region. Thus, the total voltage in the output winding 28 does not return to zero between the successive pulses. This can also be stated as follows. Because of the slight slope in the hysteresis loop there will be a finite period of time required for any region of the transducer 10 to switch from the negative saturation level to the positive saturation level of flux density. This period of time will depend upon the rate at which current through the input winding increases. Thus, the voltage pulse induced in a secondary coil, such as 34, will also have a finite width. This width is greater than the distance between adjacent pulse peaks. Thus, the voltage pulses induced in each of the secondary coils 34 through 39 will tend to run together. Thus, while the voltage pulses induced in the ordinary output windings would contain the necessary quantized information, the pulses are not normally adequately resolved for practical use unless the transition region width is considerably less than the distance between adjacent apertures. This effect imposes a limit on the time spacing of adjacent pulses from respective flux paths and thus limits the number of output pulses or quantizing levels which can be obtained from a core of given radius, wherein the core material does not have a perfect square loop hysteresis characteristic.

Figure 3:
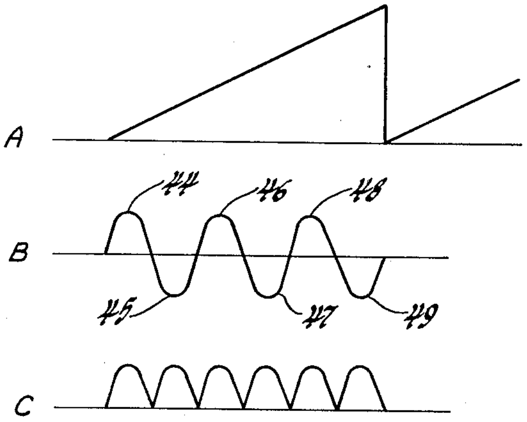
FIGURE 3 is a diagrammatic representation of the electrical signals which are present at various points in the circuit of FIGURE 1.

To successfully overcome the disadvantages outlined above and to provide greater definition between closely spaced output pulses than was previously possible, the present invention employs an output winding with the particular configuration shown in FIGURE 2. In this illustration the output winding 28 is wound on the transducer 10 such that the senses of the secondary coils 34 through 39 are alternately opposite. Since the direction of flux change in each of the portions of the transducer 10 between the apertures 22 through 26 will be in the same direction from minus to plus values of flux density, the voltages induced in adjacent secondary coils will be of opposite polarity. This can readily be seen by applying the right-hand rule to the secondary coil configuration shown in FIGURE 2. Thus, if the current produced in the input winding 14 by the analog voltage source 18 is a linearly increasing current as shown on line A of FIGURE 3, as the transition boundary is swept through successive volumes of the tranducer 10 linked by the secondary coils 34 through 39, an alternating voltage will be produced in the output winding 28 which corresponds with the voltage shown on line B of FIGURE 3. As can be seen, each of the pulses, 44–49, is distinct in time from the adjacent pulses with no overlap therebetween. Because all of the coils 34–39 are connected in series, the overlap is effectively canceled and the voltage on the output winding 28 returns to zero, or the reference line, between successive pulses.

Since secondary coil 34 links the magnetic path having the shortest effective length, a first secondary voltage pulse 44 will be induced therein. Coil 35 will be the next secondary coil in the output winding 28 to experience the rapid flux change and a pulse 45 will be induced therein. The pulse 45 is of opposite polarity from pulse 44. As the current through the input winding 14 increases in the manner described in FIGURE 3A, the field strength will continue to increase radially outward in the transducer 10 and the secondary windings 36 through 39 will, at discrete time intervals, have induced therein successive voltage pulses 46 through 49 which are of alternately opposite polarity. The series of alternating output pulses appearing on the output winding 38 is then conducted to the input terminals 31 of the full wave rectifier 30. The pulse train of FIGURE 3B is then rectified and appears on output terminals 32 as the unidirectional pulse train of FIGURE 3C.

After the entire transducer 10 has been saturated by the current in the input winding 14 in a positive direction, a pulse of current can be introduced into the reset winding 16 in the direction indicated to resaturate the entire transducer 10 in a negative direction. In this manner, the transducer 10 is made ready for the application of another analog voltage input, such as that shown in FIGURE 3A. Alternatively, the analog voltage source 18 could be designed to introduce its own negative current pulses to automatically reset the flux density in the transducer 10.

The configuration of the output winding 28 shown in FIGURE 2 has the additional advantage that any secondary current passes through adjacent coils in opposite directions thus minimizing the counter field which might otherwise subtract from the primary field.

It has been shown that the present invention makes possible a substantial increase in the number of quantizing levels which can be obtained in a given radial distance by allowing the use of more finely graduated magnetic circuit parameters. It is contemplated that various modifications may be made to the system herein illustrated without departing from the spirit and scope of this invention. For a definition of the invention reference should be made to the appended claims.

I claim:

1. In a converter, a closed magnetic core having first and second remanent flux states, a plurality of substantially parallel flux paths of progressively greater lengths defined by a plurality of apertures in the core, an input winding linking the core and adapted to conduct a current sufficient to switch at least a portion of the parallel flux paths from the first remanent state to the second, a plurality of output coils individually linking respective flux paths, each output coil linking the respective flux path in a sense opposite to the sense of the coil linking the path of immediately greater length, the plurality of output coils being connected in series thereby to provide a common output winding linking the plurality of flux paths of progressively greater lengths in alternately opposite senses, and full wave rectifying means having input and output terminals, the input terminals being connected across the common output winding.

2. In a converter, a plurality of flux paths of progressively greater lengths, each of the flux paths having first and second remanent flux states, an input winding linking the plurality of flux paths and adapted to conduct a current sufficient to switch at least a portion of the flux paths from the first remanent flux state to the second, a plurality of output coils individually linking respective flux paths, each output coil linking the respective flux path in a sense opposite to the sense of the coil linking the path of immediately greater length, the plurality of output coils being connected in series thereby to provide a common output winding linking the plurality of flux paths in alternately opposite senses, and full wave rectifying means having input and output terminals, the input terminals being connected across the common output winding.

3. Apparatus for converting a voltage into a sequence of pulses wherein the number of pulses is related to the amplitude of the voltage, the apparatus comprising, a closed magnetic core having first and second remanent flux states, a plurality of substantially parallel flux paths of progressively greater lengths defined by a plurality of apertures in the core, an input winding linking the core, a voltage source connected across the input winding and adapted to produce a current pulse therein which increases as a function of time and is sufficient to switch at least a portion of the flux paths from the first remanent state to the second, a plurality of output coils individually linking respective flux paths, each output coil linking the respective flux path in a sense opposite to the sense of the coil linking the path of immediately greater length, whereby a change in the magnetic state of the core from the first remanent state to the second induces respective voltage pulses in the output coils, the output coils linking the flux paths being connected in series thereby to provide a common output winding wherein the voltage pulses induced in the output coils appear in alternately opposite polarities, full wave rectifying means having input and output terminals, the input terminals being connected to the common output winding to receive the pulses of alternately opposite polarity, the rectifying means being adapted to produce a sequence of output pulses of a single polarity corresponding in number to the number of pulses induced in the parallel flux paths.

4. Apparatus for converting a voltage into a sequence of pulses wherein the number of pulses is related to the amplitude of the voltage, the apparatus comprising, a closed magnetic core having first and second remanent flux states, a plurality of substantially parallel flux paths of progressively greater lengths defined by a plurality of apertures in the core, an input winding linking the core, a voltage source connected across the input winding and adapted to produce a current pulse therein sufficient to switch at least a portion of the flux paths from the first remanent state to the second, the current pulse increasing in amplitude as a function of time whereby the flux paths are switched from the first remanent state to the second in succession from the shortest to the longest thereof, an output winding comprising a plurality of series connected coils, respective coils linking successive flux paths in alternately opposite senses thereby inducing voltage pulses of alternately opposite polarities in the output winding as the flux paths successively switch from the first remanent state to the second, and full wave rectifying means connected across the output winding and adapted to produce an output pulse sequence of unipolar pulses equal to the number of flux paths which have been switched from the first remanent state to the second.

5. Apparatus for converting a voltage into a sequence of pulses wherein the number of pulses is related to the amplitude of the voltage, the apparatus comprising, a closed magnetic core in the form of a flat circular disc having a primary aperture substantially central of the disc, the material exhibiting two states of high magnetic flux remanence, a plurality of substantially parallel flux paths defined by a plurality of secondary apertures spaced successively radially outward from the central opening whereby the flux paths are of successively greater lengths, an input winding linking the primary aperture, a source connected to the input winding and adapted to produce a ramp function input sufficient to switch the flux paths from one state of magnetic flux remanence to the other in succession from the shortest to the longest thereof, an output winding comprising a plurality of series connected coils, the coils linking flux paths of successively greater length in alternately opposite senses whereby a first sequence of voltage pulses of alternately opposite polarities is induced in the output winding on the occurrence of the ramp function input, and full wave rectifying means connected to the output winding to receive the first sequence of voltage pulses, the rectifying means being adapted to produce an output comprising a second sequence of voltage pulses of constant polarity and equal in number to the first sequence of voltage pulses.

6. Apparatus for converting a voltage into a sequence of pulses wherein the number of pulses is related to the amplitude of the voltage, the apparatus comprising, a plurality of flux paths each having first and second remanent flux states, a source of input voltage pulses which increase in amplitude as a function of time, an input winding connected across the source and having induced therein input current pulses corresponding to the input voltage pulses, the input winding linking each of the plurality of flux paths, the ratio of the number of input winding turns to the length of the flux path being different for each flux path whereby each of the flux paths is switched from the first remanent flux state to the second in succession at respectively different amplitudes of the input voltage pulse, an output winding comprising, a plurality of series connected coils, respective coils individually linking successively switching flux paths in alternately opposite senses thereby inducing time-spaced output voltage pulses of alternately opposite polarities in the output winding as the input voltage pulse increases in amplitude, and full wave rectifying means connected across the output winding and adapted to produce an output pulse sequence of unipolar pulses equal to the number of flux paths which have switched from the first remanent flux state to the second.

References Cited in the file of this patent

UNITED STATES PATENTS 3,017,518 Hanysz ---------------- Jan. 16, 1962